United States Patent [19]
Stiegler et al.

[11] Patent Number: 5,940,398
[45] Date of Patent: Aug. 17, 1999

[54] METHOD FOR COMMON TRANSMISSION OF DIGITAL SOURCE AND CONTROL DATA BETWEEN DATA SOURCES AND DATA SINKS CONNECTED THROUGH DATA LINES

[75] Inventors: Andreas Stiegler, Karlsbad; Herbert Hetzel, Weingarten; Hans-Peter Mauderer, Gaggenau; Matthias Winkelmann, Karlsruhe; Patrick Heck, Durmersheim, all of Germany

[73] Assignee: Becker GmbH, Karlsbad-Ittersbach, Germany

[21] Appl. No.: 08/595,841

[22] Filed: Feb. 2, 1996

[30] Foreign Application Priority Data

Feb. 2, 1995 [DE] Germany .................. 195 03 213

[51] Int. Cl.⁶ ............................................. H04J 3/16
[52] U.S. Cl. ................................. 370/424; 370/468
[58] Field of Search .................. 370/453, 460, 370/458, 452, 375, 258, 909, 223, 270, 506, 424, 465, 468, 403, 404, 405, 406, 431, 432, 437; 359/108, 118, 119, 126, 135, 136; 348/156, 423

[56] References Cited

U.S. PATENT DOCUMENTS

| | | | |
|---|---|---|---|
| 5,245,667 | 9/1993 | Lew | 381/94 |
| 5,412,652 | 5/1995 | Lu | 370/223 |
| 5,485,459 | 1/1996 | Van Steenbrugge | 370/85.4 |
| 5,612,943 | 3/1997 | Moses et al. | 369/124 |

*Primary Examiner*—Huy D. Vu
*Assistant Examiner*—Chiho Andrew Lee
*Attorney, Agent, or Firm*—Herbert L. Lerner; Laurence A. Greenberg

[57] ABSTRACT

A method for common transmission of digital source and control data between data sources and sinks being connected through data lines, includes transmitting the source and control data in a format specifying a clocked sequence of individual bit groups of equal length. In these bit groups, certain bit positions are each reserved for the source and control data and the bit positions reserved for the source data form a cohesive region within one bit group. The region of a bit group reserved for the source data is subdivided into a plurality of partial bit groups of equal length. The source data assigned to each partial bit group are allocated to a certain data source/data sink as a function of the control data.

25 Claims, 1 Drawing Sheet

METHOD FOR COMMON TRANSMISSION OF DIGITAL SOURCE AND CONTROL DATA BETWEEN DATA SOURCES AND DATA SINKS CONNECTED THROUGH DATA LINES

BACKGROUND OF THE INVENTION

FIELD OF THE INVENTION

The invention relates to a method for common transmission of digital source and control data between data sources and sinks being connected over data lines, which includes transmitting the source and control data in a format specifying a clocked sequence of individual bit groups of equal length, reserving each of certain bit positions in the groups for the source and control data, and forming a coherent region within one bit group from the bit positions reserved for the source data. Through a data line, the source and control data are transferred in a continuous data stream which is synchronous to a clock signal. The clock signal is generated by a single subscriber. All other subscribers synchronize themselves to that clock signal. Purely asynchronous data transmission methods have to be differentiated therefrom as packet or package-oriented data transmission methods, for example ATM-methods.

Methods of that type are used wherever different electrical and electronic devices that are intended to exchange information with one another are linked to one another through the use of data lines in what is sometimes a complicated way. In the audio field, for instance, communication between inter-linked data sources on one hand, such as CD players, radio receivers and cassette tape recorders, and the data sinks connected with them on the other hand, such as amplifier-speaker combinations, can be controlled by such a method.

In the course of development of CD players, the so-called SPDIF format (Sony/Philips Digital Interface Format), which is also known by the designation IEC 958, has become established as the standard. That format prescribes transmission of the data in a frame which includes two subframes or bit groups. Each subframe includes a preamble of four bits for control data, followed by 24 bits for source data and ending with four bits for special control data. One subframe of each frame is assigned to the left audio channel, and the other subframe is assigned to the right audio channel. The rigid layout of that format is disadvantageous, because it is suitable in principle only for the transmission of two channels.

SUMMARY OF THE INVENTION

It is accordingly an object of the invention to provide a method for a common transmission of digital source and control data between data sources and data sinks being connected through data lines, which overcomes the hereinafore-mentioned disadvantages of the heretofore-known methods of this general type and which can be used flexibly and in particular can be used for transmission between a number of data sources and sinks being linked together.

With the foregoing and other objects in view there is provided, in accordance with the invention, a method for common transmission of digital source and control data between data sources and sinks being connected over data lines, which includes transmitting the source and control data in a format specifying a clocked sequence of individual bit groups of equal length, reserving each of certain bit positions in the groups for the source and control data, and forming a coherent region within one bit group from the bit positions reserved for the source data, the improvement which comprises subdividing the region of a bit group reserved for the source data into a plurality of partial bit groups of equal length; and allocating the source data assigned to each partial bit group to a certain data source/data sink as a function of the control data.

A very flexible allocation of individual partial bit groups to individual data sources and data sinks is made possible by splitting up the region of a bit group reserved for the source data into a plurality of partial bit groups of equal length. For instance, the digital audio data of the left channel of a CD player can be assigned to a first partial bit group, the audio data of the associated right channel to a second partial bit group, and the video data of a video-CD player which is also connected to the network to a third and fourth partial bit group. In that way, source data from a plurality of different pieces of equipment, or of only a single piece of equipment, can be assigned to a single bit group which, in accordance with the invention, has a plurality of partial bit groups as needed, and transmitted within the network. A device or piece of equipment can be constructed simultaneously as both a data source and a data sink as is the case, for instance, for a cassette tape recorder.

The method is not limited to the transmission of audio data, but can also be used to transmit arbitrary data. For instance, besides the audio devices mentioned at the outset, video cameras, video-CD players, telephones, fax machines, microphones, CD-ROMs, or computer hard disks can be linked together. Furthermore, particularly in motor vehicles, control and monitoring units can also be included in the network. For example, it is possible to incorporate devices for monitoring the function of outside lights or the tire pressure or of devices for measuring or controlling the engine rpm or the charge pressure of a turbocharger. In this way, if the tire pressure is dropping, for instance, the audio system can issue a warning in the form of a memorized text over the speaker.

In accordance with another mode of the invention, eight bits (one byte) are used for each of the partial bit groups. Since in digital technology it is usual to combine eight bits to make one byte and this is therefore especially well supported by existing software and hardware, the splitting up of the region of the bit group reserved for the source data into partial bit groups that are each one byte in size can lead to economical and time-saving processing of the signals.

In accordance with a further mode of the invention, the region reserved for the source data is subdivided into six partial bit groups. In this way, with one bit group, the source data of up to six different devices can be transmitted simultaneously. However, it is also possible for only the source data of a single device to be transmitted with one bit group. In that case, the number of bits of source data that can be transmitted per device is six times higher than in the case of a transmission of source data for six different devices. If the partial bit groups have a length of eight bits, it is thus possible to simultaneously transmit, per bit group, eight bits for six devices or 48 for one device or arbitrary combinations between these numbers, such as 16 bits for a first device, eight bits for a second device, and 24 bits for a third device.

In accordance with an added mode of the invention, 64 bits are used for one complete bit group that includes source and control data. This doubling of the bit format over the SPDIF format results in a doubling of the transmission capacity, with simultaneous doubling of the clock frequency.

In accordance with an additional mode of the invention, each two successive bit groups are combined into one main bit group.

In accordance with yet another mode of the invention, preferably, 48 successive main bit groups are each combined into one block. By combining two successive bit groups into one main bit group, it is possible, for instance in the transmission of stereo audio data, to assign the data for the left channel to the first bit group, and the data for the right channel to the second bit group. A simple separation of the two channels in the transmission is thus possible.

In accordance with yet a further mode of the invention, in each bit group within the regions reserved for the control data, two check bits in particular are present, which are used for the transmission of control signals. The check bits of successive bit groups are each combined into one control signal. In this way, control signals of an arbitrary kind can be transmitted within the network. For example, control signals can control the allocation of the source data assigned to the partial bit groups, to the various associated pieces of equipment.

In accordance with yet an added mode of the invention, the check bits of 96 successive bit groups are each combined into one control signal. When there are two check bits per bit group, control signals with a length of 192 bits can thus be used.

In accordance with yet an additional mode of the invention, in each bit group, within the regions reserved for the control data, four bits in particular are provided as a preamble, in particular to identify the beginning of the block and/or different channels. For example, at the beginning of a block, a certain bit sequence can identify the beginning of the block and the left channel, while within a block, a bit sequence differing from the former sequence can be assigned to the preamble in order to identify the left channel. Through the use of the preamble, a distinction can be made not only between the left and right channels but between channels of any kind.

In accordance with again another mode of the invention, in each bit group within the regions reserved for the control data, a left/right identification code is allocated to a certain bit position, and as a result a simple distinction can be made between the left and the right audio channel. Due to the left/right identification, compatibility with the SPDIF format also exists, and in particular it is possible to convert the SPDIF format into the format of the invention, or vice versa.

In accordance with again a further mode of the invention, in each bit group within the regions reserved for the control data, in particular four bits suitable for the transmission of further signals are provided. Arbitrary data can be transmitted in these bits within the network. For example, in these bits, data can be transmitted unformatted. The association of the data with a device or piece of equipment in the network can be controlled through control signals that are transmitted in the check bits, for example. Such unformatted data, which is also known as "transparent" data, can be fax data, arbitrary status data, or telephone card data, for example. Since these data can be transmitted format-free, or in other words no encoding is necessary, data for time-critical applications in particular can be transmitted through these bits.

In accordance with again an added mode of the invention, in each bit group within the regions reserved for the control data, a parity identification code is assigned to a certain bit position.

In accordance with again an additional mode of the invention, in each bit group within the regions reserved for the control data, an SPDIF block identification code and/or a validation identification code and/or a user identification code and/or a channel status identification code is assigned to a certain bit position. Due to the provision of these special control bits, which are also present in the SPDIF format, compatibility with this format is thus achieved. Due to the SPDIF block identification, the relationship which is required in the SPDIF format between the control bits and the beginning of a given SPDIF block is also achieved.

In accordance with still another mode of the invention, optical fibers and/or electrical lines are used as the data lines. Data transmission at very high speed is possible especially when optical fibers are used. Moreover, the use of optical fibers makes for especially low weight, and therefore good utility, especially in mobile systems, such as in a motor vehicle.

In accordance with still a further mode of the invention, the encoding of the individual bits is carried out through the use of bi-phase coding. In this way, the clock signal, encoded into the data signal, can be transmitted together with the data signal within the network. The clock is preferably generated by a network subscriber being used as the master, and the other network subscribers work synchronously with the master by adapting themselves, for instance through phase locked loops (PLL circuits) to the clock received.

In accordance with still an added mode of the invention, the method is advantageously used in a stationary communications system, in particular in a communications system in the home. It may be a so-called multimedia system, which is made up of the most varied network subscribers that generate and/or process audio, video, control and other kinds of data.

In accordance with a concomitant mode of the invention, the method is highly advantageously usable in a mobile communications system, in particular in a communications system in a motor vehicle. It is precisely in view of the rising number of electronic devices used in a motor vehicle, and the necessary communications between these devices, that it can be very advantageous to use the method of the invention.

One advantage of the method of the invention is that digital data of the most varied kinds can be transmitted especially flexibly between an arbitrary number of devices. The allocation of the bit positions which are provided for the source data within one bit group, to the various devices, can be varied arbitrarily during operation.

Other features which are considered as characteristic for the invention are set forth in the appended claims.

Although the invention is illustrated and described herein as embodied in a method for common transmission of digital source and control data between data sources and data sinks connected through data lines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
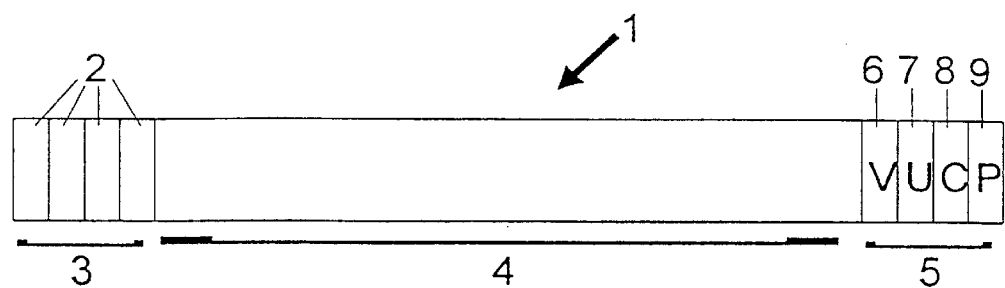
FIG. 1 is a diagrammatic view of a bit group showing a distribution of source and control data in a transmission according to the SPDIF format.

Referring now to the figures of the drawing in detail and first, particularly, to FIG. 1 thereof, there is seen a bit group 1 which represents the smallest unit of the SPDIF data format known from the prior art. This bit group is also known as a subframe and includes 32 bits. The first four bit positions 2 form a first region 3 for control data, which are used for synchronization and for distinguishing between the left and right stereo channels.

This first region 3 is followed by a region 4, having bits which are reserved for receiving source data. This region 4 has a length of 24 bits. The conclusion of a bit group 1 is formed by a second region 5 for control data, which includes four bit positions 6, 7, 8, 9 that can be occupied by a validation identification code, a user identification code, a channel status identification code, and a parity identification code.

In the case of the transmission of stereo-audio data, two successive bit groups 1 at a time are combined into a main bit group, which is a so-called frame. The first bit group contains the data for the left audio channel, and the second bit group contains the data for the right audio channel. In this way, with this format, it is possible to transmit digital source data with a maximum length of 24 bits and two channels.

Figure 2:
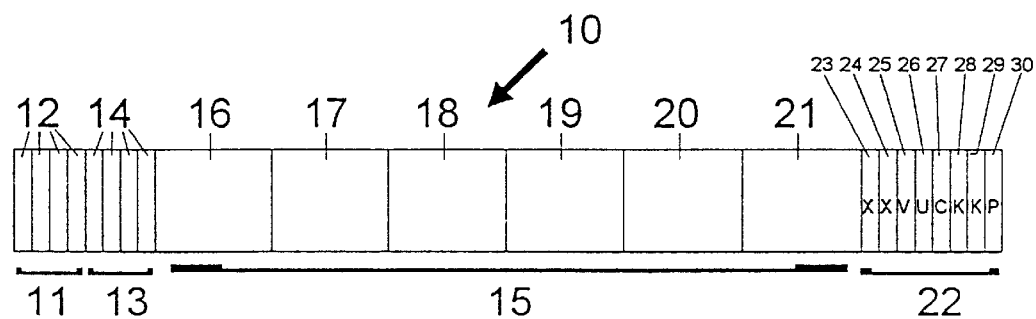
FIG. 2 is a diagrammatic view of a bit group showing a distribution of the source and control data in a transmission with a format according to the method of the invention.

FIG. 2 shows a bit group 10 of the kind used in transmitting data by the method of the invention. At the beginning of the bit group 10, there is a first region 11 which is reserved for control data and which includes four bit positions 12. The first region 11 is followed by a second region 13 which is reserved for control data and which again includes four bit positions 14.

The second region 13 is followed by a region 15 which is reserved for source data and which is divided up into six partial bit groups 16–21, each of them being eight bits long.

The end of the bit group 10 is formed by a third region 22 which is reserved for control data and which includes eight bit positions 23–30 for receiving control data.

In all, the bit group 10 includes 64 bits and it is thus twice as long as the bit group 1 according to the SPDIF format that is shown in FIG. 1.

In the transmission of data, the various bit positions are occupied as follows:

The four bit positions 12 of the first region 11, which form the preamble to the bit group 10, are occupied by a bit sequence for identifying the beginning of the block and/or different channels. The use of the next four bit positions 14 in the second region 13 is not specified in fixed fashion and therefore these positions can be occupied by arbitrary data in the transmission.

If the bit group 10 is a bit group that corresponds to the beginning of an SPDIF block, then the bit position 23 is occupied by a 1, and if not it is occupied by a 0. The bit position 24 is an identifier as to whether the left or the right channel is involved. In transmission of the source data for the left channel, for instance, the bit position 24 is occupied by a 1, while in transmission of source data for the right channel it is occupied by a 0.

The bit positions 25, 26 and 27 are occupied like the corresponding bit positions 6, 7 and 8 of the standardized SPDIF format, and the bit position 30 is occupied by a parity identification code.

The bit positions 28 and 29 of 96 successive bit groups 10 are each combined for the transmission of a control signal. The allocation of the various source data assigned to the partial bit groups 16–21, for instance, to certain subscribers of a communications network, is defined through these control signals.

Figure 3:
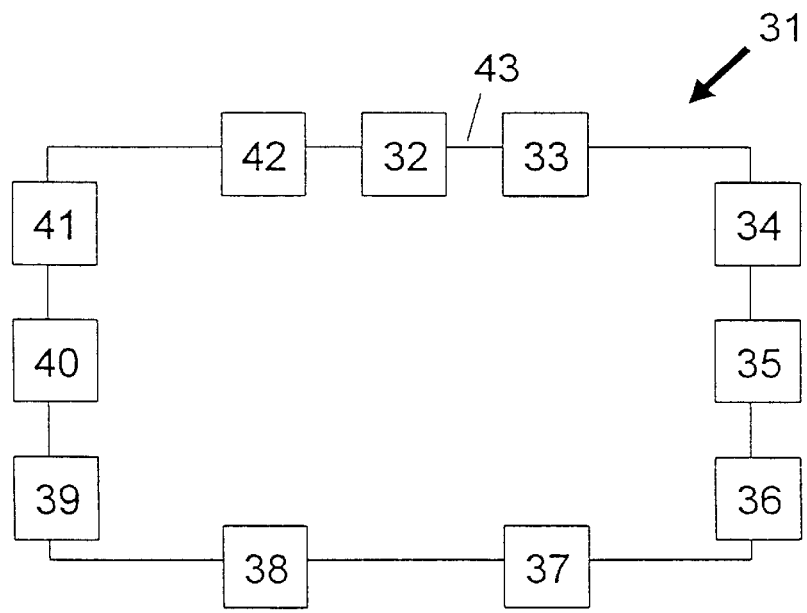
FIG. 3 is a block circuit diagram of a network which is usable, for instance, in a motor vehicle, including a number of network subscribers that are connected through individual line segments, in which the transmission of data between the individual network subscribers is possible according to the method of the invention.

FIG. 3 shows a ring-like communications network 31, which includes a number of network subscribers 32–42. The network subscribers 32–42 are connected to one another through optical fiber segments 43. Individually, the network subscribers 32–42 are a control and display unit 32, a radio receiver 33, an amplifier 34, an active speaker 35, an air conditioner control unit 36, a tire pressure monitoring device 37, a navigation system 38, a fax machine 39, a telephone 40, a video camera 41 and a CD player 42.

Such a complex multimedia network can be built into a motor vehicle, for instance. The transmission of the communications data among the various network subscribers can then be carried out by the method of the invention, in each case through an optical fiber segment 43 that includes a single optical fiber.

A typical allocation of the partial bit groups 16–21 to the various network subscribers 32–42 during network operation can look like the following, for example:

The audio data of the left channel of the CD player 42 are transmitted in the partial bit groups 16 and 17 of a first bit group 10, as are video data of the left channel of the video camera 41 in the partial bit groups 18 and 19, telephone data of the telephone 40 in the partial bit group 20, and fax data of the fax machine 39 in the partial bit group 21. In the next bit group, the data for the corresponding right channels of the CD player 42 and the video camera 41 are transmitted, along with further telephone and fax data.

As operation continues, instead of the video data of the video camera 41, for instance, source data of the navigation system can be transmitted to the control and display unit 32 in the partial bit groups 18 and 19. This new allocation of the partial bit groups 18 and 19 to a different subscriber in the network 31 is controlled through control signals, which are transmitted in the bit positions 28, 29 of successive bit groups 10.

Due to the flexible allocation of the partial bit groups 16–21 to the network subscribers 32–42, highly effective, fast and economical transmission of source data between the network subscribers 32–42 is possible, through a single optical fiber including individual optical fiber segments 43.

We claim:

1. In a method for common transmission of digital source and control data between data sources and sinks being connected over data lines, which includes transmitting the source and control data in a format specifying a clocked sequence of individual bit groups of equal length, reserving each of certain bit positions in the bit groups for the source and control data, and forming a coherent region within one bit group from the bit positions reserved for the source data, the improvement which comprises:

subdividing the region of a bit group reserved for the source data into a plurality of partial bit groups of equal length; and allocating the source data assigned to each partial bit group to a certain data source/data sink as a function of the control data.

2. The method according to claim 1, which comprises using eight bits for each of the partial bit groups.

3. The method according to claim 1, which comprises subdividing the region reserved for the source data into six partial bit groups.

4. The method according to claim 1, which comprises using 64 bits for one complete bit group.

5. The method according to claim 1, which comprises combining each two successive bit groups into one main bit group.

6. The method according to claim 1, which comprises combining each of a plurality of main bit groups into one block.

7. The method according to claim 1, which comprises combining each of 48 successive main bit groups into one block.

8. The method according to claim 6, which comprises providing a plurality of bits as a preamble in each bit group within the regions reserved for the control data.

9. The method according to claim 6, which comprises providing four bits as a preamble in each bit group within the regions reserved for the control data, to identify at least one of the beginning of the block and different channels.

10. The method according to claim 1, which comprises providing a plurality of check bits in each bit group within the regions reserved for the control data, using the check bits for the transmission of control signals, and combining the check bits of successive bit groups into one control signal.

11. The method according to claim 1, which comprises providing two check bits in each bit group within the regions reserved for the control data, using the two check bits for the transmission of control signals, and combining the check bits of successive bit groups into one control signal.

12. The method according to claim 10, which comprises combining each of the check bits of 96 successive bit groups into one check signal.

13. The method according to claim 1, which comprises allocating a left/right identification code to a certain bit position in each bit group within the regions reserved for the control data.

14. The method according to claim 1, which comprises providing a plurality of bits suitable for the transmission of further signals in each bit group within the regions reserved for the control data.

15. The method according to claim 1, which comprises providing four bits suitable for the transmission of further signals in each bit group within the regions reserved for the control data.

16. The method according to claim 1, which comprises assigning a parity identification code to a certain bit position in each bit group within the regions reserved for the control data.

17. The method according to claim 1, which comprises assigning an SPDIF block identification code to a certain bit position in each bit group within the regions reserved for the control data.

18. The method according to claim 1, which comprises assigning a validation identification code to a certain bit position in each bit group within the regions reserved for the control data.

19. The method according to claim 1, which comprises assigning a user identification code to a certain bit position in each bit group within the regions reserved for the control data.

20. The method according to claim 1, which comprises assigning a channel status identification code to a certain bit position in each bit group within the regions reserved for the control data.

21. The method according to claim 1, which comprises connecting the data sources and sinks over at least one of optical fibers and electrical lines being used as the data lines.

22. The method according to claim 1, which comprises encoding the individual bits with bi-phase coding.

23. In a method for common transmission of digital source and control data between data sources and sinks connected over data lines in a stationary communications system which includes transmitting the source and control data in a format specifying a clocked sequence of individual bit groups of equal length, reserving each of certain bit positions in the bit groups for the source and control data, and forming a coherent region within one bit group from the bit positions reserved for the source data, the improvement which comprises:

subdividing the region of a bit group reserved for the source data into a plurality of partial bit groups of equal length; and allocating the source data assigned to each partial bit group to a certain data source/data sink as a function of the control data.

24. In a method for common transmission of digital source and control data between data sources and sinks connected over data lines in a mobile communications system which includes transmitting the source and control data in a format specifying a clocked sequence of individual bit groups of equal length, reserving each of certain bit positions in the bit groups for the source and control data, and forming a coherent region within one bit group from the bit positions reserved for the source data, the improvement which comprises:

subdividing the region of a bit group reserved for the source data into a plurality of partial bit groups of equal length; and allocating the source data assigned to each partial bit group to a certain data source/data sink as a function of the control data.

25. In a method for common transmission of digital source and control data between data sources and sinks being connected over data lines, which includes transmitting the source and control data in a format specifying a clocked sequence of individual bit groups of equal length, reserving each of certain bit positions in the bit groups for the source and control data, and forming a coherent region within one bit group from the bit positions reserved for the source data, the improvement which comprises:

subdividing the region of a bit group reserved for the source data into a plurality of partial bit groups of equal length;

allocating the source data assigned to each partial bit group to a certain data source/data sink as a function of the control data; and providing a plurality of check bits in each bit group within the regions reserved for the control data, using the check bits for the transmission of control signals, and combining the check bits of 96 successive bit groups into one check signal.

* * * * *